(12) United States Patent
Santos

(10) Patent No.: US 9,878,839 B2
(45) Date of Patent: Jan. 30, 2018

(54) SEAWEED-BASED FOOD PACKAGING COATING

(71) Applicant: Mantrose-Haeuser Co., Inc., Lincoln, RI (US)

(72) Inventor: Stephen A. Santos, Cumberland, RI (US)

(73) Assignee: Mantrose-Haeuser Co., Inc., Westport, CT (US)

( * ) Notice: Subject to any disclaimer, the term of this patent is extended or adjusted under 35 U.S.C. 154(b) by 43 days.

(21) Appl. No.: 13/894,782

(22) Filed: May 15, 2013

(65) Prior Publication Data

US 2013/0323368 A1    Dec. 5, 2013

Related U.S. Application Data

(60) Provisional application No. 61/646,989, filed on May 15, 2012.

(51) Int. Cl.
```
B65D 81/24     (2006.01)
D21H 27/10     (2006.01)
B65D 65/46     (2006.01)
B32B 29/06     (2006.01)
D21H 17/30     (2006.01)
D21H 17/00     (2006.01)
D21H 17/02     (2006.01)
D21H 17/21     (2006.01)
D21H 17/28     (2006.01)
D21H 19/34     (2006.01)
```

(52) U.S. Cl.
CPC .............. *B65D 81/24* (2013.01); *B32B 29/06* (2013.01); *B65D 65/466* (2013.01); *D21H 17/005* (2013.01); *D21H 17/02* (2013.01); *D21H 17/21* (2013.01); *D21H 17/28* (2013.01); *D21H 17/30* (2013.01); *D21H 19/34* (2013.01); *D21H 27/10* (2013.01); *Y02W 90/11* (2015.05); *Y10T 428/31993* (2015.04)

(58) Field of Classification Search
CPC .... B65D 85/8043; B65D 1/0207; B32B 29/00
USPC ........................................................ 426/106
See application file for complete search history.

(56) References Cited

U.S. PATENT DOCUMENTS

```
3,413,190  A      11/1968  Aycock et al.
5,089,307  A  *    2/1992  Ninomiya et al. ........... 428/35.2
5,849,374  A  *   12/1998  Gruber et al. ............... 428/34.3
7,083,673  B2      8/2006  Bowden et al.
7,452,927  B2 *   11/2008  Hayes ........................... 523/223
7,618,485  B2 *   11/2009  Renn ....................... 106/162.81
2003/0191210 A1   10/2003  Autran
2003/0204027 A1   10/2003  Autran
2003/0204028 A1   10/2003  Autran
2003/0236358 A1   12/2003  Autran et al.
2004/0059047 A1    3/2004  Autran et al.
2004/0217987 A1   11/2004  Celli et al.
2005/0039689 A1    2/2005  Mossmer
2005/0192377 A1    9/2005  Scheer et al.
2007/0129467 A1    6/2007  Scheer
2007/0148384 A1    6/2007  Bowden et al.
2007/0203283 A1    8/2007  Scheer
2007/0259139 A1   11/2007  Furneaux
2008/0113887 A1    5/2008  Scheer et al.
2008/0153940 A1    6/2008  Scheer et al.
2010/0316863 A1 * 12/2010  Kumamoto et al. ......... 428/292.1
2012/0276596 A1 * 11/2012  Pere et al. ..................... 435/101
2014/0216672 A1 *  8/2014  Feng ...................... D21H 17/69
                                                         162/169
```

FOREIGN PATENT DOCUMENTS

```
EP          0672505          9/1995
JP       2001509525 A        7/2001
JP       2003013391          1/2003
JP       2011068835          4/2011
WO      2009006570 A1        1/2009
WO      2010037906 A1        4/2010
WO       201006575 A1        7/2010
WO      2011025858 A1        3/2011
```

OTHER PUBLICATIONS

Narendra Reddy, Yang Y. Critic Acid Cross-linking of Starch Films, Feb. 1, 2010, Food Chemistry, pp. 702-711.*
PaperOnWeb, Grades of Pulp and Paper, Captured 2010 <https://web.archive.org/web/20100109081036/http://www.paperonweb.com/gradepl.htm>.*
Bjerre-Peterson et al."Furcellaran," Industrial Gums, R.L., Whistler, Ed.; Academic Press, Neew Your, 2nd ed., 1973; pp. 123-136.
Liu, P. et al., "Glass transition temperature of starch studied by a high-speed DSC," Carbohydrate Polymers, vol. 77, Jan. 14, 2009; 250-253; figure 7.
International Search Report and Written Opinion from International Application No. PCT/US2013/41104, dated Sep. 27, 2013.
Second Office Action from Chinese Patent Application No. 201380025325.9 dated Mar. 4, 2016.
English translation of Notice of Reason for Rejection for Japanese Patent Application No. 2015-512784 dated Feb. 14, 2017.
Search Report from EP application No. 13790325.8 dated Oct. 20, 2015.
Search Report from Singapore Patent Application No. 11201407455P dated Oct. 21, 2015.

(Continued)

*Primary Examiner* — Viren A Thakur
*Assistant Examiner* — Thanh H Nguyen
(74) *Attorney, Agent, or Firm* — Calfee, Halter & Griswold LLP

(57) ABSTRACT

A food packaging material comprises a paper, paperboard or cardboard substrate and a barrier coating on the substrate, wherein the barrier coating comprises the combination of starch, seaweed extract and paper fibers.

28 Claims, No Drawings

(56) References Cited

OTHER PUBLICATIONS

Khwaldia, K. et al., "Biopolymer coatings on paper packaging materials," Comprehensive Review in Food Science and Food Safety, Dec. 21, 2009, vol. 9, i, 1, pp. 82-91.

* cited by examiner

SEAWEED-BASED FOOD PACKAGING COATING

CROSS-REFERENCE TO RELATED APPLICATION

This application is based on, and claims the benefit of, U.S. Provisional Application Ser. No. 61/646,989 filed on May 15, 2012, the entire disclosure of which is incorporated herein by reference.

BACKGROUND

Plain paper and paperboard are not used to protect food for long periods of time due to their poor barrier properties and leaching of impurities into the food products. If paper/cartons are to be used in direct contact with food they need to be coated with a range of materials. Multi-layer packaging materials (typically 3 to 9 layers) enhance the functional and protective properties of the packaging. Coating application techniques are well known, the most common ones are; spraying, blade and rotating (or printing).

Examples of materials which have been used for these coatings include wax, perfluorooctanoic acid, various high barrier polymers and polyvinylidene chloride. However, most of these materials are not recyclable, biodegradable or compostable, while some present health risks if combusted.

SUMMARY OF INVENTION

In accordance with this invention, a new packaging material is provided which not only is recyclable, biodegradable and compostable but also produces non-toxic oxidation products when combusted.

Thus, this invention provides a new food packaging material comprising a paper, paperboard or cardboard substrate and a barrier coating on the substrate, wherein the barrier coating comprises the combination of starch, seaweed extract and paper fibers.

In addition, this invention also provides a new process for making such a food packaging material, the process comprising applying an aqueous coating composition to a paper, paperboard or cardboard substrate and thereafter allowing the coated substrate to dry thereby forming the barrier coating, wherein the coating composition comprises the combination of starch, seaweed extract and paper fibers.

In addition, this invention further provides a packaged food product comprising a package and a food item inside the package, wherein the package is formed from a packaging material comprising a paper, paperboard or cardboard substrate and a barrier coating on the substrate, wherein the barrier coating comprises the combination of starch, seaweed extract and paper fibers.

DETAILED DESCRIPTION

A wide variety of edible, film-forming materials, including seaweed extracts, have been uses to form protective barriers on various food products by directly coating the food product with the edible, film-forming material. Seaweed extracts are an interesting example of such a material, because many of the barrier films they form have good oxygen vapor barrier properties and are impervious to fats and oils. However, most of these materials, including seaweed extracts, are too brittle to form effective barriers when applied to paper and related food packaging materials due to their poor flexibility and mechanical strength. In accordance with this invention, this problem is overcome by combining the seaweed extract with starch and paper fibers.

Seaweed Extract

Many different types of seaweed extracts are known. In this regard, any seaweed extract which is film forming and which exhibits oxygen vapor barrier properties can be used to make the barrier coatings of the inventive packaging materials, examples of which include alginates, carageenan, agar and furcellaran.

Alginate is a polysaccharide derived from brown seaweed known as phaeophycease, it is a 1-4 linked poly-uronic. Alginates produce uniform, transparent and water soluble films. Divalent cations are normally used as gelling agents in alginate film formation to induce ionic interactions followed by forming hydrogen bonding. Alginates have good film forming properties but they tend to be quite brittle when dry. Alginate based films are impervious to oils and fats but they have poor moisture barriers. Also, alginate coatings have good oxygen barriers, can retard lipid oxidation in foods and improve flavor texture and better adhesion.

Carageenan is derived from red seaweed, and is a complex mixture of several polysaccharides. The three principal carageenan fractions are kappa, iota and lambda. Carageenan based coatings have long been applied to a variety of foods due to their antimicrobial and antioxidant characteristics, in addition to reduce moisture loss, oxidation and disintegration.

Agar is a gum that is derived from a variety of red seaweeds, and like carageenan it is a galactose polymer. Agar forms strong gels which are characterized by melting points above the initial gelation temperature. Like carageenan antibiotics, bacteriocins or natural antimicrobial compound can be incorporated in agar based films. These films can be used in order to improve shelf life and to control pathogenic bacterial growth.

Furcellaran is gum obtained from seaweed of the Rhodophyceae, the red alga *Furcellaria fastigiata*, fam. Furcellariaceae, order Gigartinales. The weed is found primarily in Northern European waters, especially in the Kattegat (between Sweden and Denmark). The gum is the potassium salt of the sulfuric acid ester of a high molecular weight polysaccharide. Consists mainly of D-galactose, 3,6-anhydro-D-galactose, and the half-ester sulfates of these sugars; one sulfate group occurs for each three or four monomeric units, which are arranged in an alternating sequence of $(1 \rightarrow 3)$ and $(1 \rightarrow 4)$-linked units. Review: Bjerre-Petersen et al. in Industrial Gums, R. L. Whistler, Ed. (Academic Press, New York, 2nd ed., 1973) pp 123-136.

When in the form of a processed gum, furcellaran is a white, odorless powder, which is soluble in hot or warm water. It is easily dispersed in cold water to form a homogeneous suspension without lumps. Furcellaran particles hydrate, swell and become almost invisible but do not dissolve unless heated. Furcellaran forms agar-like gels at low concentrations. The strength of the gel can be increased by adding salts, especially potassium salts. Highly viscous solutions in neutral medium are not adversely affected by prolonged exposure to high heat. However, exposure to heat in acidic media results in rapid hydrolysis and loss of gelling power.

Furcellaran is used as a natural colloid, a gelling agent, and a viscosity control agent primarily in food products but also in pharmaceuticals. It is also used in products for diabetics, proprietary products for reducing excess body weight, in toothpastes, and as a carrier for food preservatives and as a bactericide in bacteriological culture media.

Starch

Starch is one of the most abundant natural polysaccharides with a world production of 49 million tons in 2000 (80% corn starch). It can be obtained commercially from a range of sources and typically occurs in the form of granules. It is available both in native form ("unmodified starch") or in derivative form) ("modified starch").

Modified starch, also called starch derivatives, is prepared by physically, enzymatically, or chemically treating native starch, thereby changing its properties. For example, starches can be modified to increase their stability against excessive heat, acid, shear, time, cooling, or freezing; to change their texture; to decrease or increase their viscosity; to lengthen or shorten gelatinization time; or to increase their visco-stability. Examples of modified starches include dextrin, maltodextrin, alkaline-modified starch, bleached starch, oxidized starch, enzyme-treated starch, maltodextrin, cyclodextrin, monostarch phosphate, distarch phosphate, crosslinked starch, acetylated starch, hydroxypropylated starch, hydroxyethyl starch, cationic starch, and carboxymethylated starch, just to name a few.

Starch is normally a mix of amylase and amylopectin polymers. Starches and their derivatives have been used to modify physical properties of food products for decades contributing to modifying texture, viscosity, gel formation, adhesion, binding moisture retention, product homogeneity and film formation. Starch films are often transparent, odorless, tasteless, and colorless and they are used in the packing and food coating due to their low $O_2$ permeability. The film composition, in particular the contents of amylase, amylopectine, water and other plasticizers and the film formation conditions has significant effect on the glass transition temperature ($T_g$ is the temperature at which the forces holding the principle components of an amorphous solid together are overcome) and crystallinity. The mechanical properties of starch films primarily depend on the mobility of the macromolecular chains in the amorphous phase and the degree of crystallinity. Films formed at temperatures below the glass transition temperature ($T_g$) are brittle, while films formed at temperatures higher than the $T_g$ are flexible and extendable. Normally starch films are good barriers to oxygen, since oxygen is a non-polar gas and cannot be dissolved in starch films. On the other hand, starch films are less resistant to $CO_2$ due to the higher solubility of $CO_2$ in starch films.

Starch is a very abundant, inexpensive, renewable material with wide applications in food, pharmaceuticals, packaging etc. because of its non-harmful/environmentally friendly characteristics. In this regard, starch qualifies as a compliant material under relevant regulations in the EEC, in particular Packaging & Packaging Waste Directive (94/62/EC) and European Framework Regulation (EC) No. 1935/2004 on Materials and Articles Intended to Come into Contact with Foodstuffs.

In accordance with this invention, any starch or starch derivative which is both edible and film forming can be used as the starch ingredient of the barrier coatings of the inventive packaging material.

As appreciated in the art, starch products can suffer from a number of drawbacks which limit their use as barrier coatings. These include:
  Poor stability and prone to hydrolysis and disintegration in contact with water
  Biodegrades easily in the presence of enzymes that attack the glucoside bonds causing the long polymer chains to break down (Enzymatic hydrolysis)
  Poor physical strength/integrity that lead to degradation.

In accordance with this invention, however, these problems are overcome by combining the starch with paper fibers and seaweed extract. In some embodiments, the starch used to form the barrier coating of the inventive packaging material has a $T_g$ lower than the temperature at which the barrier coating is formed, as the barrier coatings made in this way exhibit a higher degree of flexibility than would otherwise be the case.

Paper Fibers

Paper fiber or paper pulp is a lignocellulosic fibrous material prepared by chemically or mechanically separating cellulose fibers from wood, fiber crops or waste paper. Wood provides about 90% of the basis for pulp production, while about 10% originates from annual plants. Pulp is one of the most abundant raw materials worldwide. It is most commonly used as raw material in papermaking, but is also used for in textiles, food, pharmaceutical and many other industries as well.

In this regard, paper fiber or paper pulp is also known to qualify as a compliant material under relevant regulations in the EEC, in particular Packaging & Packaging Waste Directive (94/62/EC) and European Framework Regulation (EC) No. 1935/2004 on Materials and Articles Intended to Come into Contact with Foodstuffs.

The timber resources used to make wood (paper) pulp are referred to as pulpwood. Wood pulp comes from softwood trees such as spruce, pine, fir, larch and hemlock, and hardwoods such as eucalyptus, aspen and birch.

A pulp mill is a manufacturing facility that converts wood chips or other plant fiber source into a thick fiber board which can be shipped to a paper mill for further processing. Pulp can be manufactured using mechanical, semi-chemical or fully chemical methods (craft and sulfite processes). The finished product may be either bleached or non-bleached, depending on the customer requirements.

Wood and other plant materials used to make pulp contain three main components (apart from water): cellulose fibers (desired for papermaking), lignin (a three-dimensional polymer that binds the cellulose fibers together) and hemicelluloses, (shorter branched carbohydrate polymers). The aim of pulping is to break down the bulk structure of the fiber source, be it chips, stems or other plant parts, into the constituent fibers.

Chemical pulping achieves this by degrading the lignin and hemicellulose into small, water-soluble molecules which can be washed away from the cellulose fibers without depolymerizing the cellulose fibers (chemically depolymerizing the cellulose weakens the fibers). The various mechanical pulping methods, such as groundwood (GW) and refiner mechanical (RMP) pulping, physically tear the cellulose fibers one from another. Much of the lignin remains adhering to the fibers. Strength is impaired because the fibers may be cut. There are a number of related hybrid pulping methods that use a combination of chemical and thermal treatment to begin an abbreviated chemical pulping process, followed immediately by a mechanical treatment to separate the fibers. These hybrid methods include thermomechanical pulping, also known as TMP, and chemithermomechanical pulping, also known as CTMP. The chemical and thermal treatments reduce the amount of energy subsequently required by the mechanical treatment, and also reduce the amount of strength loss suffered by the fibers.

In accordance with this invention, paper fibers produced by any of these techniques can be used to make the barrier coatings of the inventive packaging materials. In some embodiments, paper fibers produced by chemical pulping are desirable, as the paper fibers obtained from this manufacturing process have a relatively low concentration of lignin and hemicellulose and have not been depolymerized in any significant way.

Additional Additives

In addition to the three primary components indicated above, the barrier coatings of the inventive packaging material can include a variety of additional ingredients for modifying the properties of the barrier coatings ultimately obtained as well as the rheological properties of the aqueous coating compositions from which they are made.

For example, in addition to water, the coating compositions of this invention can include one or more additional carrier liquids to facilitate the coating operation. Examples of suitable carrier liquids include water, various alcohols such as methanol, ethanol, isopropanol, etc. various ketones such as acetone, methyl ethyl ketone, etc., various glycols such as propylene glycol, etc., various glycol ethers, various esters such as ethyl acetate, and so forth. If an additional carrier liquid is used, the amount used is desirably less than 50 wt. %, more desirably less than 35 wt. %, less than 25 wt. % or even less than 15 wt. % of the total amount of liquid carrier in the compositions.

Moreover, in addition to the seaweed extract and starch components described above, the inventive barrier coatings can include additional film forming ingredients, if desired. Examples of such additional film forming ingredients include shellac and shellac analogues including lipids and resins including waxes and oils such as paraffin wax, carnauba wax, beeswax, candelila wax and polyethylene wax; fatty acids and monoglycerides such as stearyl alcohol, stearic acid, palmitic acid, mono- and di-glycerides; naturally-occurring resins such as wood resin; and coumarone-indene. Appropriate shellac analogues may also be selected from proteins including corn zein (a-zein, b-zein and/or v-zein), wheat gluten, soy protein, peanut protein, keratin, collagen, gelatin, milk protein (casein) and whey protein. Mixtures of these materials can also be used.

An especially interesting additional film forming ingredient is polylactic acid, also known as polylactides, as they are both biodegradable and compostable.

If such additional film forming ingredients are used, the total concentration of all of these additional film forming ingredients should not exceed 40 wt. % of barrier coating ultimately obtained. More desirably, the total concentration of all of these additional film forming ingredients should not exceed 25 wt. %, 10 wt. % or even 5 wt. % of barrier coating ultimately obtained.

Still additional ingredients that can be included in the inventive protective coatings include plasticizers and detackifiers. Examples of suitable plasticizers include glycols such as polyethylene glycol (PEG), polypropylene glycol (PPG), etc., lipids such as vegetable oils, mineral oils, medium chain triglycerides, fats, fatty acids, waxes, etc. Examples of suitable detackifiers include proteins such as zein, etc. and lipids such as acetylated monoglycerides, medium chain triglycerides, oils, waxes, fatty acids such as stearic acid and oleic acid, etc. Generally speaking, the amount of plasticizer and detackifier in the barrier coatings ultimately obtained each should not exceed 15 wt. % of this barrier coating, with the combined amounts of both of these ingredients desirably not exceeding 25 wt. % of the barrier coating ultimately obtained. More desirably, the amounts of each of these ingredients should not exceed 10 wt. % or even 5 wt. % of the barrier coatings ultimately obtained.

Manufacture

The inventive packaging product is made by coating a substrate comprising paper, paperboard or cardboard with an aqueous coating composition containing the combination of starch, seaweed extract and paper fibers. Although any coating process can be used including immersion coating, curtain coating, roller coating, knife blade coating, screen coating and the like, spray coating is desired in many applications due to its simplicity and ease of control.

For this purpose, aqueous coating compositions can be prepared which have viscosities and concentrations of ingredients suitable for spray coating purposes. Such viscosities are well known in the coating arts, while the appropriate ingredient concentrations can be easily determined by routine experimentation.

In this regard, the thickness of the barrier coating of the inventive packaging material can vary widely and essentially any thickness that will provide the desired degree of protection can be used. Normally, the coating compositions used to form the inventive protective coatings will be formulated so that they can be applied in a single application, although multiple applications can be used, if desired.

The proportions of ingredients in the aqueous coating compositions of this invention can also vary widely and essentially any amounts can be used. Normally, these coatings will contain at least about 20 wt. % seaweed extract based on the combined weight of the barrier coating, i.e., the combined weight of all ingredients in the coating composition excluding any liquid carrier used to apply the coating. More commonly, these barrier coatings will contain at least 25, 30, 35, 40, 45 or even 50 wt. % or more of seaweed extract on this basis.

Similarly, these barrier coatings also will typically contain at least about 20 wt. % starch based on the combined weight of the barrier coating, More commonly, they will contain at least 25, 30, 35, 40, 45 or even 50 wt. % or more of starch on this basis. In the same way, these barrier coatings will typically contain at least about 20 wt. % paper fibers, but more commonly at least 25, 30, 35, 40, 45 or even 50 wt. % or more, of paper fibers on this basis.

These barrier coatings may also contain about 0-40 wt. % detackifier on the same basis, although detackifier concentrations on the order of >0 to 30 wt. %, about 2 to 20 wt. % or even about 5-15 wt. % are also interesting. Similarly, these barrier coatings may contain about 0-30 wt. % plasticizer on the same basis, although plasticizer concentrations on the order of >0 to 20 wt. %, about 1 to 15 wt. % or even about 2-10 wt. % are also of interest.

The concentration of the liquid carrier used to form the coating compositions used to form the inventive protective coatings can also vary widely, and essentially any amount can be used. Concentrations of liquid carrier on the order of about 20 to 90 wt. % or more are possible, based on the total weight of the coating composition as a whole, although concentrations on the order of 40 to 85 wt. %, 55 to 75 wt. % are more common.

Properties

The inventive packaging products are formulated to be biodegradable and compostable. In this context, "degradable" refers to a material which undergoes a significant change in its chemical structure under specific environmental conditions, resulting in a loss of some properties. Meanwhile, a biodegradable material is a degradable material which degrades from naturally occurring microorganisms, such as bacterial, fungi, etc. A compostable material is a biodegradable material which biodegrades in a similar time frame as cellulose into a decomposition product which is both non-toxic and disintegrated.

Preferred packaging materials of this invention are those which are not only biodegradable but also compostable.

Especially preferred packaging materials conform with ASTM-6400 relating to Compostable Plastics. As described there, a Compostable Plastic conforming to this standard is one which is "capable of undergoing biological decomposition in a compost site as part of an available program, such that the plastic is not visually distinguishable and breaks down to carbon dioxide, water, inorganic compounds, and biomass, at a rate consistent with known compostable materials (e.g. cellulose). and leaves no toxic residue."

Under ASTM-6400, a plastic is compostable if it exhibits certain minimum levels of biodegradability, ability to disintegrate and non-toxicity. A plastic is biodegradable under this standard if at least 60% of the plastic biodegrades in 180 days, as measured by the amount of $CO_2$ produced by this decomposition. A plastic is disintegratable under this standard if less than 10% of its decomposition product, when sieved, remains on a 2 mm screen. A plastic is non-toxic under this standard if the heavy metal content of its decomposition product remains below certain prescribed limits and, in addition, if when combined with soil in different concentrations it is capable of supporting a certain level of plant growth relative to a control compost.

Compostable plastics, as well as packaging and other products made therefrom, are described in a number of recently published and/or issued patent documents, examples of which include: U.S. Pat. No. 7,083,673, US 2008/0153940, US 2008/0113887, US 2007/0259139, US 2007/0203283, US 2007/0148384, US 2007/0129467, US 2004/0217087, US 2005/0192377, US 2005/0039689, US 2004/0059047, US 2003/0236358, US 2003/0204028, US 2003/0204027 and US 2003/0191210. The disclosures of these documents are incorporated herein by reference.

The inventive packaging material, although technically not a plastic, nonetheless conforms to the requirements of ASTM-6400, at least in its preferred embodiments.

In addition to the above properties of biodegradability and compostability, the inventive packaging materials also desirably exhibit an oxygen permeability of $3 \times 10^{-16}$ mol m/m$^2$ sPa or less. Preferred inventive packaging materials exhibit oxygen permeabilities of $2 \times 10^{-16}$ mol m/m$^2$ sPa or less or even $1 \times 10^{-16}$ mol m/m$^2$ sPa or less.

In addition the inventive packaging materials are also lipid insoluble. In this context, "lipid insoluble" means that the inventive packaging materials exhibit a fat retention of ≤1% w/w. Preferred inventive packaging materials exhibit a fat retention of ≤0.5% w/w, or even ≤0.2% w/w.

Finally, the inventive packaging materials desirably exhibit a $CO_2$ permeability of $3.5 \times 10^{-15}$ mol m/m$^2$ sPa or less, more desirably $2.5 \times 10^{-15}$ mol m/m$^2$ sPa or less, or even $1 \times 10^{-15}$ mol m/m$^2$ sPa or less.

Although only a few embodiments of this invention have been described above, it should be appreciated that many modifications can be made without departing from the spirit and scope of this invention. All such modifications are intended to be included within the scope of this invention, which is to be limited only by the following claims.

The invention claimed is:

1. A food packaging material comprising a paper, paperboard or cardboard substrate and a barrier coating on the substrate, wherein the barrier coating is made by coating the substrate with an aqueous coating composition containing the ingredients of the barrier coating, wherein the barrier coating comprises at least 20 wt. % starch, at least 20 wt. % seaweed extract and at least 20 wt. % paper pulp, these percents being based on the combined weight of all ingredients forming the barrier coating but excluding any liquid carrier used to apply the coating composition.

2. The food packaging material of claim 1, wherein the seaweed extract comprises alginate, carageenan, agar, or a mixture thereof.

3. The food packaging material of claim 1, wherein the food packaging material is biodegradable.

4. The food packaging material of claim 3, wherein the food packaging material is compostable.

5. The food packaging material of claim 1, wherein the barrier coating includes polylactic acid.

6. The food packaging material of claim 1, wherein the starch of the barrier coating is crosslinked by means of a polycarboxylic acid.

7. The food packaging material of claim 6, wherein the polycarboxylic acid is one or more of citric acid, malic acid, tartaric acid and lactic acid.

8. The food packaging material of claim 1, wherein the barrier coating contains a sufficient amount of paper pulp so that the barrier coating is flexible and a sufficient amount of seaweed extract to exhibit a low oxygen permeability.

9. The food packaging material of claim 8, wherein the barrier coating is water-vapor impermeable.

10. The food packaging material of claim 1, wherein the barrier coating also includes shellac or shellac analogue.

11. A process for making a food packaging material comprising a paper, paperboard or cardboard substrate and a barrier coating on the substrate, the process comprising applying an aqueous coating composition to the substrate and thereafter allowing the coated substrate to dry thereby forming the barrier coating, wherein the coating composition comprises at least 20 wt. % starch, at least 20 wt. % seaweed extract and at least 20 wt. % paper pulp, these percents being based on the combined weight of all ingredients forming the barrier coating but excluding any liquid carrier used to apply the coating composition.

12. The process of claim 11, wherein the seaweed extract comprises alginate, carageenan, agar, or a mixture thereof.

13. The process of claim 11, wherein the coating composition includes polylactic acid.

14. The process of claim 11, wherein the coating composition contains a polycarboxylic acid capable of crosslinking the starch in the coating composition.

15. The process of claim 14, wherein the polycarboxylic acid is one or more of citric acid, malic acid, tartaric acid and lactic acid.

16. The process of claim 11, wherein the coating composition contains a sufficient amount of paper pulp so that the barrier coating is flexible and a sufficient amount of seaweed extract so that the barrier coating exhibits a low oxygen permeability.

17. The process of claim 11, wherein the coating composition contains about 4 to 30 wt. % starch.

18. The process of claim 11, wherein the starch used to form the barrier coating has a glass transition temperature, $T_g$, and further wherein the barrier layer is formed at a temperature which is below this $T_g$.

19. A packaged food product comprising a package and a food item inside the package, wherein the package is formed from the food packaging material of claim 1.

20. The food packaging material of claim 1, wherein the barrier coating optionally contains an additional film forming ingredient other than seaweed extract and starch, and further wherein the maximum amount of this optional additional film forming ingredient is 25 wt. %, based on the combined weight of all ingredients forming the barrier coating but excluding any liquid carrier used to apply the coating composition.

21. The food packaging material of claim 20, wherein the maximum amount of the optional additional film forming ingredient in the barrier coating is 10 wt. %.

22. The food packaging material of claim 1, wherein the aqueous composition contains film forming ingredients and further wherein the film forming ingredients in the aqueous composition consist of seaweed extract, starch and an additional, optional film forming agent other than seaweed extract and starch selected from the group consisting of lipids, paraffin wax, carnauba wax, beeswax, candelila wax, polyethylene wax, fatty acids, fatty acid monoglycerides, fatty acid di-glycerides, wood resin, coumarone-indene, shellac, corn zein, wheat gluten, soy protein, peanut protein, keratin, collagen, gelatin, milk protein, whey protein, polylactides and mixtures thereof.

23. The food packaging material of claim 1, wherein the barrier coating, comprises at least 40 wt. % starch.

24. The food packaging material of claim 1, wherein the barrier coating, comprises at least 40 wt. % seaweed extract.

25. The food packaging material of claim 1, wherein the barrier coating, comprises at least 40 wt. % paper pulp.

26. The food packaging material of claim 1, wherein the barrier coating, comprises at least 30 wt. % starch, at least 30 wt. % seaweed extract and at least 30 wt. % paper pulp.

27. The food packaging material of claim 1, wherein the paper pulp comprises cellulosic fibers that have been recovered by chemically or mechanically separating cellulosic fibers from the lignin and hemicellulose found in the lignocellulose recovered from wood, fiber chips and/or waste paper without substantially chemically depolymerizing the cellulosic fibers.

28. The food packaging material of claim 1, wherein the paper pulp comprises wood pulp.

* * * * *